United States Patent
Hu et al.

(10) Patent No.: US 9,519,951 B2
(45) Date of Patent: Dec. 13, 2016

(54) DOWNSAMPLING BASED DISPLAY METHOD AND APPARATUS

(71) Applicant: Shenzhen China Star Optoelectronics Technology Co., Ltd., Shenzhen, Guangdong (CN)

(72) Inventors: Houliang Hu, Guangdong (CN); Hao Li, Guangdong (CN); Li-wei Chu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 171 days.

(21) Appl. No.: 14/396,057

(22) PCT Filed: Sep. 15, 2014

(86) PCT No.: PCT/CN2014/086510
§ 371 (c)(1),
(2) Date: Oct. 22, 2014

(87) PCT Pub. No.: WO2016/029515
PCT Pub. Date: Mar. 3, 2016

(65) Prior Publication Data
US 2016/0063675 A1    Mar. 3, 2016

(30) Foreign Application Priority Data
Aug. 27, 2014  (CN) .......................... 2014 1 04295147

(51) Int. Cl.
G06T 3/40    (2006.01)
(52) U.S. Cl.
CPC .................. *G06T 3/4007* (2013.01)

(58) Field of Classification Search
None
See application file for complete search history.

(56) References Cited

U.S. PATENT DOCUMENTS

| 2007/0160153 | A1* | 7/2007 | Sullivan | G06T 3/4007 375/240.29 |
| 2010/0165204 | A1* | 7/2010 | Huang | G06T 3/4007 348/581 |

(Continued)

OTHER PUBLICATIONS

Kopf, Johannes, Ariel Shamir, and Pieter Peers. "Content-adaptive image downscaling." ACM Transactions on Graphics (TOG) 32.6 (2013): 173.*

(Continued)

*Primary Examiner* — Zhengxi Liu
(74) *Attorney, Agent, or Firm* — Andrew C. Cheng (57) ABSTRACT

Downsampling based display method and apparatus are provided. An input image including multiple pixels is obtained. At least two pixels neighboring with a to-be-calculated DS pixel on each of at least two directions from the pixels are obtained to get at least four first neighboring pixels. Theoretical values of each first neighboring pixel on the at least two directions are calculated. Errors of the theoretical values of each first neighboring pixel and a corresponding original value are obtained. Weight coefficients for calculating the DS pixel are determined according to the errors. An estimation value of the DS pixel is calculated according to the weight coefficients and the weighted cubic interpolation calculation model. As to the other DS pixels of target image, corresponding estimation values are calculated using the above steps, and then a downsampling processed image is obtained. The color aliasing is avoided and sharp image is obtained.

13 Claims, 5 Drawing Sheets

(56) References Cited

U.S. PATENT DOCUMENTS

| | | | |
|---|---|---|---|
| 2011/0182502 A1* | 7/2011 | Liang | G06T 3/4007 382/162 |
| 2013/0250105 A1* | 9/2013 | Ellis | G06T 3/005 348/144 |
| 2014/0111532 A1* | 4/2014 | Manchi | G06T 3/4007 345/582 |

OTHER PUBLICATIONS

Lin, Weisi, and Li Dong. "Adaptive downsampling to improve image compression at low bit rates." Image Processing, IEEE Transactions on 15.9 (2006): 2513-2521.*

Clouard, "Tutorial: Image Rescaling", published on Jun. 18, 2011, retrieved from https://clouard.users.greyc.fr/Pantheon/experiments/rescaling/index-en.html on Jun. 4, 2016.*

* cited by examiner

DOWNSAMPLING BASED DISPLAY METHOD AND APPARATUS

TECHNICAL FIELD

The present invention relates to the field of image processing technology, and particularly to a downsampling based display method and a downsampling based display apparatus.

DESCRIPTION OF RELATED ART

Conventional portable multimedia players (PMPs) and personal digital assistants (PDAs) generally display images with low-resolution. When a content inputted into these apparatuses is high-resolution, it is necessary to perform a downsampling (DS) processing on the high-resolution content. For example, the content with resolution of 1280*960 is down to a resolution of 640*480 by the downsampling processing.

Currently, the downsampling methods can be classified into pixel-based downsampling and subpixel-based downsampling. In one aspect, when performing an average pixel-based DS (APD), for example obtaining RGB values of four pixels and then calculating averages thereof to obtain a new RGB value, although such APD method is simple in calculation, it would result in the problems of reduced resolution and image blurring. In another aspect, when performing the subpixel-based DS, for example obtaining RGB values of subpixels in diagonal directions to obtain a new image, although the subpixel-based DS method can obtain an image sharper than that obtained by the APD method, it would cause the problem of color aliasing.

SUMMARY

Accordingly, a technical problem to be solved by the present invention is to provide a downsampling based display method and a downsampling based display apparatus, so as to obtain sharp image and avoid color aliasing.

In order to solve the above technical problem, the present invention provides a downsampling based display method. The method includes: obtaining an input image, wherein the input image includes a plurality of pixels; obtaining at least two pixels neighboring with a to-be-calculated DS pixel in a target image on each of at least two directions from the plurality of pixels of the input image to obtain at least four first neighboring pixels, and calculating theoretical values of each of the at least four first neighboring pixels on the at least two directions; obtaining errors between the theoretical values of each of the at least four first neighboring pixels and a corresponding original value, and determining weight coefficients for calculating the DS pixel according to the errors; and calculating an estimation value of the DS pixel according to the weight coefficients and a weighted cubic interpolation calculation model built in advance for the DS pixel, using the above steps to calculate corresponding estimation values of the other DS pixels in the target image, and thereby obtaining a downsampling processed image.

In an exemplary embodiment, after the step of obtaining an input image, the method further includes: obtaining at least four pixels neighboring with the DS pixel on each of at least two directions from the plurality of pixels of the input image to obtain at least eight second neighboring pixels, and building the weighted cubic interpolation calculation model according to the at least eight second neighboring pixels.

In an exemplary embodiment, the at least two directions are four directions of 0-degree, 45-degree, 90-degree and 135-degree with respect to the DS pixel, and correspondingly sixteen second neighboring pixels are obtained; the weighted cubic interpolation calculation model is:

$$p_m = k_0(\lambda_1 A + \lambda_2 B + \lambda_3 C + \lambda_4 D) + k_{45}(\lambda_1 P_{h1} + \lambda_2 P_{h2} + \lambda_3 P_{h3} + \lambda_4 P_{h4}) + k_{90}(\lambda_1 E + \lambda_2 F + \lambda_3 G + \lambda_4 H) + k_{135}(\lambda_1 P_{h5} + \lambda_2 P_{h6} + \lambda_3 P_{h7} + \lambda_4 P_{h8});$$

where $p_m$ is the DS pixel, $\lambda_1$, $\lambda_2$, $\lambda_3$, $\lambda_4$ are cubic interpolation coefficients, $P_{h1} \sim P_{h4}$ are four pixels neighboring with $p_m$ on a 45-degree direction of $p_m$ in the plurality of pixels of the input image, $P_{h5} \sim P_{h8}$ are four pixels neighboring with $p_m$ on a 135-degree direction of $p_m$ in the plurality of pixels of the input image; A, B, C, D are four pixels neighboring with $p_m$ on a 0-degree direction of $p_m$ in the plurality of pixels of the input image; E, F, G, H are four pixels neighboring with $p_m$ on a 90-degree direction of $p_m$ in the plurality of pixels of the input image; $k_0$, $k_{45}$, $k_{90}$, $k_{135}$ are weight coefficients, and $k_0 + k_{45} + k_{90} + k_{135} = 1$.

In an exemplary embodiment, values of A, B, C, D, E, F, G, H are determined according to the following formulas:

$$W_1 = \lambda_1 P_{n1} + \lambda_2 P_{n2} + \lambda_3 P_{n3} + \lambda_4 P_{n4} \tag{1}$$

$$W_2 = \lambda_1 P_{m1} + \lambda_2 P_{m2} + \lambda_3 P_{m3} + \lambda_4 P_{m4} \tag{2}$$

where, the obtained four pixels on each of the four directions of 0-degree, 45-degree, 90-degree and 135-degree with respect to the DS pixel cooperatively constitute a pixel array of 4*4; the formula (1) is used to calculate the values of A, B, C, D; $P_{n1}$, $P_{n2}$, $P_{n3}$, $P_{n4}$ are four pixels in each column of the pixel array; the formula (2) is used to calculate the values of E, F, G, H; and $P_{m1}$, $P_{m2}$, $P_{m3}$, $P_{m4}$ are four pixels in each row of the pixel array.

In an exemplary embodiment, the step of calculating theoretical values of each of the at least four first neighboring pixels on the at least two directions includes: substituting an original value of each pixel of the at least four first neighboring pixels into a cubic interpolation formula to calculate the theoretical values of the pixel on the at least two directions, wherein the cubic interpolation formula is: $P'_{j1}(x) = \lambda_1 P_{j2} + \lambda_2 P_{j3} + \lambda_3 P_{j4} + \lambda_4 P_{j5}$; where, x is a value of a corresponding one of the at least two directions, $P_{j2}$, $P_{j3}$, $P_{j4}$, $P_{j5}$ are pixels neighboring with the DS pixel on the corresponding direction of the DS pixel in the plurality of pixels of the input image; $P'_{j1}$ is an interpolation value of $P_{j2}$, $P_{j3}$, $P_{j4}$, $P_{j5}$.

In an exemplary embodiment, the at least two directions are two directions of 45-degree and 135-degree with respect to the DS pixel, and correspondingly eight second neighboring pixels are obtained; the weighted cubic interpolation calculation model is:

$$p_m = k_{45}(\lambda_1 P_{h1} + \lambda_2 P_{h2} + \lambda_3 P_{h3} + \lambda_4 P_{h4}) + k_{135}(\lambda_1 P_{h5} + \lambda_2 P_{h6} + \lambda_3 P_{h7} + \lambda_4 P_{h8});$$

where, pm is the DS pixel, $\lambda_1$, $\lambda_2$, $\lambda_3$, $\lambda_4$ are cubic interpolation coefficients, $P_{h1} \sim P_{h4}$ are four pixels neighboring with $p_m$ on a 45-degree direction of $p_m$ in the plurality of pixels of the input image, and $P_{h5} \sim P_{h8}$ are four pixels neighboring with $p_m$ on a 135-degree direction of $p_m$ in the plurality of pixels of the input image; $k_{45}$, $k_{135}$ are weight coefficients, and $k_{45} + k_{135} = 1$.

In an exemplary embodiment, the step of calculating theoretical values of each of the at least four first neighboring pixels on the at least two directions includes: substituting an original value of each pixel of the at least four first neighboring pixels into a cubic interpolation formula to calculate the theoretical values of the pixel on the at least two directions, wherein the cubic interpolation formula is: $P'_{j1}(x)=\lambda_1 P_{j2}+\lambda_2 P_{j3}+\lambda_3 P_{j4}+\lambda_4 P_{j5}$; where x is a value of a corresponding one of the at least two directions, $P_{j2}$, $P_{j3}$, $P_{j4}$, $P_{j5}$ are pixels neighboring with the DS pixel on the corresponding direction of the DS pixel in the plurality of pixels of the input image; $P'_{j1}$ is an interpolation value of $P_{j2}$, $P_{j3}$, $P_{j4}$, $P_{j5}$.

In order to solve the above technical problem, the present invention further provides a downsampling based display apparatus adapted for being inputted with an image including a plurality of pixels. The display apparatus includes: a pixel theoretical value calculation unit, configured to obtain at least two pixels neighboring with a to-be-calculated DS pixel in a target image on each of at least two directions from the plurality of pixels of the input image to thereby obtain at least four first neighboring pixels, and calculate theoretical values of each pixel of the at least four first neighboring pixels on the at least two directions; a weighted cubic interpolation calculation unit, configured to obtain at least four pixels neighboring with the DS pixel on each of at least two directions from the plurality of pixels of the input image to thereby obtain at least eight second neighboring pixels, and build a weighted cubic interpolation calculation model for calculating the DS pixel in advance according to the at least eight second neighboring pixels; a weight coefficient calculation unit, configured to obtain errors of the theoretical values of each pixel of the at least four first neighboring pixels and a corresponding original value, and determine weight coefficients for calculating the DS pixel according to the errors; and a DS pixel calculation unit, configured to select a corresponding weighted cubic interpolation calculation model according to the weight coefficients to calculate an estimation value of the DS pixel. The display apparatus calculates a corresponding estimation value of each DS pixel in the target image, and thereby a downsampling processed image is obtained.

In an exemplary embodiment, the at least two directions are four directions of 0-degree, 45-degree, 90-degree and 135-degree with respect to the DS pixel, and correspondingly sixteen second neighboring pixels are obtained; the weighted cubic interpolation calculation model built by the weighted cubic interpolation calculation unit in advance is:

$$p_m = k_0(\lambda_1 A + \lambda_2 B + \lambda_3 C + \lambda_4 D) + k_{45}(\lambda_1 P_{h1} + \lambda_2 P_{h2} + \lambda_3 P_{h3} + \lambda_4 P_{h4}) + k_{90}(\lambda_1 E + \lambda_2 F + \lambda_3 G + \lambda_4 H) + k_{135}(\lambda_1 P_{h5} + \lambda_2 P_{h6} + \lambda_3 P_{h7} + \lambda_4 P_{h8});$$

where $p_m$ is the DS pixel, $\lambda_1$, $\lambda_2$, $\lambda_3$, $\lambda_4$ are cubic interpolation coefficients, $P_{h1} \sim P_{h4}$ are four pixels neighboring with $p_m$ on a 45-degree direction of $p_m$ in the plurality of pixels of the input image, $P_{h5} \sim P_{h8}$ are four pixels neighboring with $p_m$ on a 135-degree direction of $p_m$ in the plurality of pixels of the input image; A, B, C, D are four pixels neighboring with $p_m$ on a 0-degree direction of $p_m$ in the plurality of pixels of the input image; E, F, G, H are four pixels neighboring with $p_m$ on a 90-degree direction of $p_m$ in the plurality of pixels of the input image; $k_0$, $k_{45}$, $k_{90}$, $k_{135}$ are weight coefficients, and $k_0+k_{45}+k_{90}+k_{135}=1$.

In an exemplary embodiment, the pixel theoretical value calculation unit substitutes an original value of each pixel of the at least four first neighboring pixels into a cubic interpolation formula to calculate the theoretical values of the pixel on the at least two directions, and the cubic interpolation formula is: $P'_{j1}(x)=\lambda_1 P_{j2}+\lambda_2 P_{j3}+\lambda_3 P_{j4}+\lambda_4 P_{j5}$; where x is a value of a corresponding one of the at least two directions, $P_{j2}$, $P_{j3}$, $P_{j4}$, $P_{j5}$ are pixels neighboring with the DS pixel on the corresponding direction of the DS pixel in the plurality of pixels of the input image; $P'_{j1}$ is an interpolation value of $P_{j2}$, $P_{j3}$, $P_{j4}$, $P_{j5}$.

In an exemplary embodiment, the at least two directions are two directions of 45-degree and 135-degree with respect to the DS pixel, and correspondingly eight second neighboring pixels are obtained; the weighted cubic interpolation calculation model is:

$$p_m = k_{45}(\lambda_1 P_{h1} + \lambda_2 P_{h2} + \lambda_3 P_{h3} + \lambda_4 P_{h4}) + k_{135}(\lambda_1 P_{h5} + \lambda_2 P_{h6} + \lambda_3 P_{h7} + \lambda_4 P_{h8});$$

where, pm is the DS pixel, $\lambda_1$, $\lambda_2$, $\lambda_3$, $\lambda_4$ are cubic interpolation coefficients, $P_{h1} \sim P_{h4}$ are four pixels neighboring with $p_m$ on a 45-degree direction of $p_m$ in the plurality of pixels of the input image, and $P_{h5} \sim P_{h8}$ are four pixels neighboring with $p_m$ on a 135-degree direction of $p_m$ in the plurality of pixels of the input image; $k_{45}$, $k_{135}$ are weight coefficients, and $k_{45}+k_{135}=1$.

In an exemplary embodiment, the pixel theoretical value calculation unit substitutes an original value of each pixel of the at least four first neighboring pixels into a cubic interpolation formula to calculate the theoretical values of the pixel on the at least two directions, and the cubic interpolation formula is: $P'_{j1}(x)=\lambda_1 P_{j2}+\lambda_2 P_{j3}+\lambda_3 P_{j4}+\lambda_4 P_{j5}$; where x is a value of a corresponding one of the at least two directions, $P_{j2}$, $P_{j3}$, $P_{j4}$, $P_{j5}$ are pixels neighboring with the DS pixel on the corresponding direction of the DS pixel in the plurality of pixels of the input image; $P'_{j1}$ is an interpolation value of $P_{j2}$, $P_{j3}$, $P_{j4}$, $P_{j5}$.

In order to solve the above technical problem, the present invention further provides a downsampling based display method. The method includes: obtaining an input image, wherein the input image comprises a plurality of pixels; obtaining at least four pixels neighboring with a to-be-calculated DS pixel in a target image on each of at least two directions from the plurality of pixels of the input image to obtain at least eight second neighboring pixels, and building a weighted cubic interpolation calculation model according to the at least eight second neighboring pixels; obtaining at least two pixels neighboring with the DS pixel on each of at least two directions from the plurality of pixels of the input image to obtain at least four first neighboring pixels, and calculating theoretical values of each pixel of the at least four first neighboring pixels on the at least two directions; obtaining errors between the theoretical values of each pixel of the at least four first neighboring pixels and a corresponding original value of the pixel, and determining weight coefficients for calculating the DS pixel according to the errors; and calculating an estimation value of the DS pixel according to the weight coefficients and the weighted cubic interpolation calculation model, using the above steps to calculate corresponding estimation values of the other DS pixels in the target image, and thereby obtaining a downsampling processed image.

Sum up, the present invention provides downsampling based display method and display apparatus, by building a weighted cubic interpolation model for a to-be-calculated DS pixel, using the model to calculate theoretical values of original image pixels neighboring with the to-be-calculated DS pixel, then analyzing errors between the theoretical values and corresponding original values to obtain weight coefficients fed back to the weighted cubic interpolation model for calculating the DS pixel. Such DS method of pixel-based calculation can avoid the color aliasing of the subpixel-based DS method, and also can obtain sharp image.

In order to further understand the features and technical contents of the present invention, please refer to the following detailed description and accompanying drawings of the present invention. However, the drawings are provided for the purpose of illustration and description only, and are not intended to limit the present invention.

BRIEF DESCRIPTION OF THE DRAWINGS

Embodiments of the present invention will be described below in detail with reference to the drawings, and thereby the technical solutions of the present invention and other beneficial effects will be more apparent. In the drawings.

DETAILED DESCRIPTION OF EMBODIMENTS

In the following, with reference to accompanying drawings of embodiments of the present invention, technical solutions in the embodiments of the present invention will be clearly and completely described. Apparently, the embodiments of the present invention described below only are a part of embodiments of the present invention, but not all embodiments. Based on the described embodiments of the present invention, all other embodiments obtained by ordinary skill in the art without creative effort belong to the scope of protection of the present invention.

Firstly, derivation principles of a cubic interpolation coefficient Bicubic and a cubic interpolation formula will be described below.

If the expression of a function f(x) and its derivatives at x=0, x=1 are given, the function can be interpolated in the range of [0, 1]; and when the expression of the function is a cubic polynomial, it is referred to as cubic interpolation.

The derivation principle of the cubic interpolation coefficient Bicubic will be described as follows.

Setting the cubic polynomial f(x) and its derivative f'(x) respectively are:

$$f(x)=ax^3+bx^2+cx+d \quad (1)$$

$$f'(x)=3ax^2+2bx+c \quad (2)$$

The cubic polynomial f(x) and its derivative f'(x) at x=0, x=1 respectively are:

$$f(0)=d \quad (3)$$

$$f(1)=a+b+c+d \quad (4)$$

$$f'(0)=c \quad (5)$$

$$f'(1)=3a+2b+c \quad (6)$$

The above four equations (3)~(6) are equivalently transformed to be:

$$a=2f(0)-2f(1)+f'(0)+f'(1) \quad (7)$$

$$b=-3f(0)+3f(1)-2f'(0)-f'(1) \quad (8)$$

$$c=f'(0) \quad (9)$$

$$d=f(0) \quad (10)$$

It is assumed that values of four points $P_0$, $P_1$, $P_2$, $P_3$ respectively are known as f(−1), f(0), f(1), f(2), formulas can be obtained as follows:

$$f(0)=P_1 \quad (11)$$

$$f(1)=P_2 \quad (12)$$

$$f'(0)=(P_2-P_0)/2 \quad (13)$$

$$f'(1)=(P_3-P_1)/2 \quad (14)$$

After substituting the formulas (11)~(14) into the formulas (7)~(10) to calculate the coefficients a, b, c, a bicubic formula can be obtained as follows:

$$f(P_0, P_1, P_2, P_3, x) = \left(-\frac{1}{2}P_0 + \frac{3}{2}P_1 - \frac{3}{2}P_2 + \frac{1}{2}P_3\right)x^3 + \left(P_0 - \frac{5}{2}P_1 + 2P_2 - \frac{1}{2}P_3\right)x^2 + \left(-\frac{1}{2}P_0 + \frac{1}{2}P_2\right)x + P_1 \quad (15)$$

Setting the interpolation is x=0.5 and substituting x=0.5 into the formula (15), a formula (16) then can be obtained as follows:

$$f(0.5) = -\frac{1}{16}P_0 + \frac{9}{16}P_1 + \frac{9}{16}P_2 - \frac{1}{16}P_3 \quad (16)$$
$$= \lambda_1 f(-1) + \lambda_2 f(0) + \lambda_3 f(1) + \lambda_4 f(2)$$

where $\lambda_1, \lambda_2, \lambda_3, \lambda_4$ are cubic interpolation coefficients, and $$\lambda_1 = -\frac{1}{16}, \lambda_2 = \frac{9}{16}, \lambda_3 = \frac{9}{16}, \lambda_4 = -\frac{1}{16}.$$

Setting $x_{0.5}$ is an interpolation of $x_{-1}$, $x_0$, $x_1$ and $x_2$, the formula (16) can be changed to be the following formula (17), i.e., a cubic interpolation formula:

$$f(x_{0.5})=\lambda_1 f(x_{-1})+\lambda_2 f(x_0)+\lambda_3 f(x_1)+\lambda_4 f(x_2) \quad (17)$$

Figure 1:
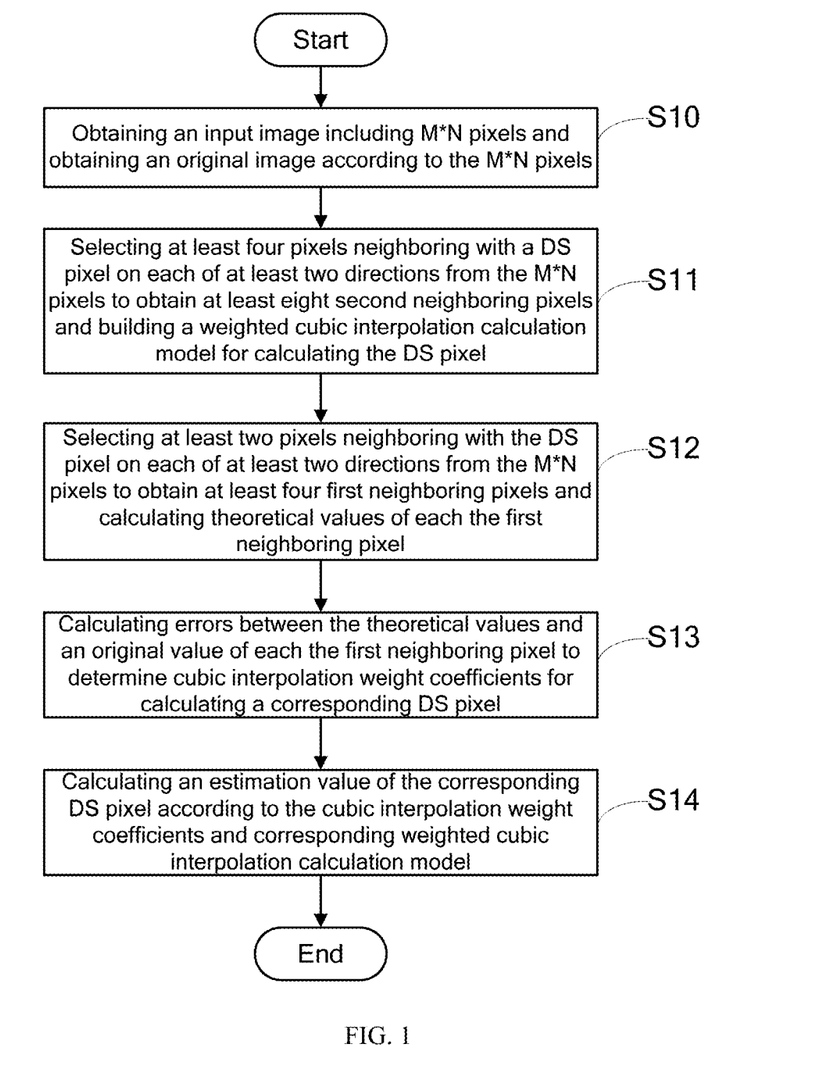
FIG. 1 is a flowchart of a downsampling based display method according to an exemplary embodiment of the present invention.

Referring to FIG. 1, which is a flowchart of a downsampling based display method according to an exemplary embodiment of the present invention. The method is for calculating DS pixels of converting an original image containing a pixel array of M*N into an image containing a pixel array of P*Q, where M, N, P, Q are natural numbers and P≤M, Q≤N. The DS pixels are pixels obtained after performing a downsampling (DS) processing on M*N pixels of the original image. By using the method to calculate each DS pixel in the pixel array of P*Q, a downsampling processed image with a resolution lower than that of the original image finally is formed. The method includes the following steps S10, S11, S12, S13 and S14.

Step S10: obtaining an input image including M*N pixels, and obtaining an original image according to the M*N pixels.

A video streaming image or picture image collected by a method such as mutual transmission among camera, network download and facility can be used as current input image.

Step 11: selecting at least four pixels neighboring with a to-be-calculated pixel on each of at least two directions from the M*N pixels of the original image to obtain at least eight second neighboring pixels, and building a weighted cubic interpolation calculation model for calculating a corresponding DS pixel according to the obtained at least eight second neighboring pixels.

In a first embodiment, the at least two directions are four directions of 0-degree, 45-degree, 90-degree and 135-degree with respect to the DS pixel. The weighted cubic interpolation calculation model is a 0-45-90-135 model. Specifically, four pixels neighboring with the DS pixel on each of the four directions of 0-degree, 45-degree, 90-degree and 135-degree are selected from the M*N pixels in the original image to obtain sixteen second neighboring pixels, and then the sixteen second neighboring pixels are used to build the weighted cubic interpolation calculation model.

The weighted cubic interpolation calculation model is:

$$p_m = k_0(\lambda_1 A + \lambda_2 B + \lambda_3 C + \lambda_4 D) + k_{45}(\lambda_1 P_{h1} + \lambda_2 P_{h2} + \lambda_3 P_{h3} + \lambda_4 P_{h4}) + k_{90}(\lambda_1 E + \lambda_2 F + \lambda_3 G + \lambda_4 H) + k_{135}(\lambda_1 P_{h5} + \lambda_2 P_{h6} + \lambda_3 P_{h7} + \lambda_4 P_{h8});$$

where $p_m$ is a to-be-calculated DS pixel, $\lambda_1, \lambda_2, \lambda_3, \lambda_4$ are cubic interpolation coefficients, $P_{h1} \sim P_{h4}$ are four pixels neighboring with $p_m$ on the 45-degree direction of $p_m$ in the M*N pixels of the original image, $P_{h5} \sim P_{h8}$ are four pixels neighboring with $p_m$ on the 135-degree direction of $p_m$ in the M*N pixels of the original image, A, B, C, D are four pixels neighboring with $p_m$ on the 0-degree direction of $p_m$ in the M*N pixels of the original image, E, F, G, H are four pixels neighboring with $p_m$ on the 90-degree direction of $p_m$ in the M*N pixels of the original image, $k_0, k_{45}, k_{90}, k_{135}$ are weight coefficients, and $k_0 + k_{45} + k_{90} + k_{135} = 1$.

Furthermore, values of A, B, C, D, E, F, G, H are determined by the following formulas:

$$W_1 = \lambda_1 P_{n1} + \lambda_2 P_{n2} + \lambda_3 P_{n3} + \lambda_4 P_{n4} \quad (18)$$

$$W_2 = \lambda_1 P_{m1} + \lambda_2 P_{m2} + \lambda_3 P_{m3} + \lambda_4 P_{m4} \quad (19)$$

The obtained four pixels on each of the four directions of 0-degree, 45-degree, 90-degree and 135-degree with respect to the DS pixel cooperatively constitute a pixel array of 4*4. The formula (18) is for calculating the values of A, B, C, D. $P_{n1}, P_{n2}, P_{n3}, P_{n4}$ are four pixels of each column in the pixel array of 4*4. The formula (19) is for calculating the values of E, F, G, H. $P_{m1}, P_{m2}, P_{m3}, P_{m4}$ are four pixels of each row in the pixel array of 4*4.

In a second embodiment, the at least two directions are two directions of 45-degree and 135-degree with respect to the DS pixel, and the weighted cubic interpolation calculation model is a 45-135 model. Specifically, four pixels neighboring the DS pixel on each of the two directions of 45-degree and 135-degree with respect to the DS pixel are selected from the M*N pixels of the original image to obtain eight second neighboring pixels, and then the eight neighboring pixels are used to build the weighted cubic interpolation calculation model.

The weighted cubic interpolation calculation model is:

$$p_m = k_{45}(\lambda_1 P_{h1} + \lambda_2 P_{h2} + \lambda_3 P_{h3} + \lambda_4 P_{h4}) + k_{135}(\lambda_1 P_{h5} + \lambda_2 P_{h6} + \lambda_3 P_{h7} + \lambda_4 P_{h8});$$

where $p_m$ is the DS pixel, $\lambda_1, \lambda_2, \lambda_3, \lambda_4$ are cubic interpolation coefficients, $P_{h1} \sim P_{h4}$ are four pixels neighboring with $p_m$ on the 45-degree direction of $p_m$ in the M*N pixels of the original image, $P_{h5} \sim P_{h8}$ are four pixels neighboring with $p_m$ on the 135-degree direction of $p_m$ in the M*N pixels of the original image, $k_{45}, k_{135}$ are weight coefficients, and $k_{45} + k_{135} = 1$.

Step S12: selecting at least two pixels neighboring with the DS pixel on each of at least two directions from the pixel array of M*N in the original image to obtain at least four first neighboring pixels, and calculating theoretical values of each of the at least four first neighboring pixels by using the cubic interpolation formula (17).

Step S13: calculating an error between the theoretical value of each of the at least four first neighboring pixels and an original value of the first neighboring pixel, and then determining the weight coefficients for calculating a corresponding DS pixel according to the errors.

Step S14: selecting a corresponding weighted cubic interpolation calculation model, and calculating an estimation value of the DS pixel according to the determined weight coefficients.

Moreover, as to the other DS pixels of the target image, corresponding estimation values can be calculated by using the above steps, and thereby the downsampling processed image can be obtained.

The DS pixel being p22 is taken as an example to describe the present invention below in detail.

Figure 2:
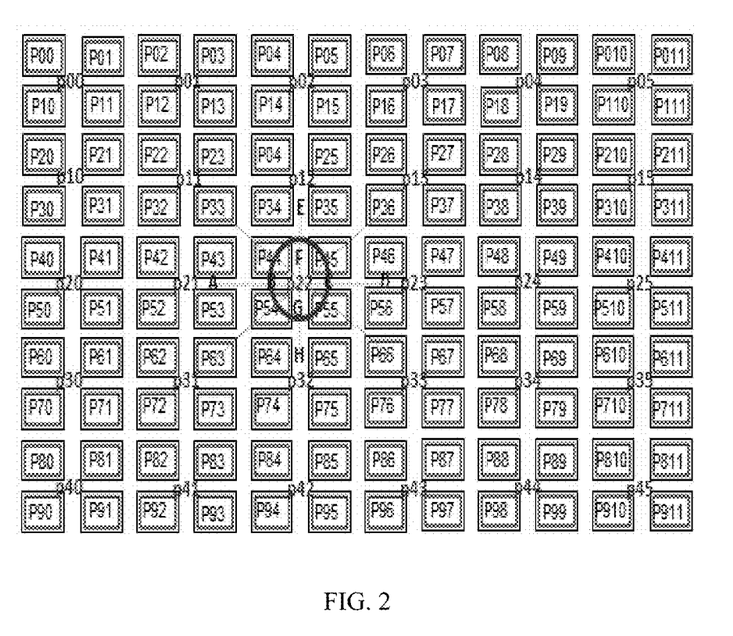
FIG. 2 is a schematic view of a pixel array for building a weighted cubic interpolation model according to a first embodiment of the present invention.

Please also refer to FIG. 2, which is a schematic view of a pixel array for building a weighted cubic interpolation calculation model according to a first embodiment of the present invention. As illustrated in FIG. 2, P00~P911 are pixels in an original image, p00~p45 are to-be-calculated DS pixels.

As described in the step S11, the weighted cubic interpolation calculation model for calculating p22 is:

$$p_{22} = k_0(\lambda_1 A + \lambda_2 B + \lambda_3 C + \lambda_4 D) + k_{45}(\lambda_1 P_{63} + \lambda_2 P_{54} + \lambda_3 P_{45} + \lambda_4 P_{36}) + k_{90}(\lambda_1 E + \lambda_2 F + \lambda_3 G + \lambda_4 H) + k_{135}(\lambda_1 P_{33} + \lambda_2 P_{44} + \lambda_3 P_{55} + \lambda_4 P_{66});$$

where $P_{63}, P_{54}, P_{45}, P_{36}$ are the four pixels neighboring with p22 on the 45-degree direction of p22 in the pixels P00~P911 of the original image; and $P_{33}, P_{44}, P_{55}, P_{66}$ are the four pixels neighboring with p22 on the 135-degree direction of p22 in the pixels P00~P911 of the original image According to the cubic interpolation coefficients $\lambda_1, \lambda_2, \lambda_3, \lambda_4$ and the four pixels neighboring with p22 on each of the four directions of 0-degree, 45-degree, 90-degree and 135-degree with respect to p22 in the pixels P00~P911 of the original image, the values of A, B, C, D, E, F, G, H are determined as:

$$A = \lambda_1 P_{33} + \lambda_2 P_{43} + \lambda_3 P_{53} + \lambda_4 P_{63}$$

$$B = \lambda_1 P_{34} + \lambda_2 P_{44} + \lambda_3 P_{54} + \lambda_4 P_{64}$$

$$C = \lambda_1 P_{35} + \lambda_2 P_{45} + \lambda_3 P_{55} + \lambda_4 P_{65}$$

$$D = \lambda_1 P_{36} + \lambda_2 P_{46} + \lambda_3 P_{56} + \lambda_4 P_{66}$$

$$E = \lambda_1 P_{33} + \lambda_2 P_{34} + \lambda_3 P_{35} + \lambda_4 P_{36}$$

$$F = \lambda_1 P_{43} + \lambda_2 P_{44} + \lambda_3 P_{45} + \lambda_4 P_{46}$$

$$G = \lambda_1 P_{53} + \lambda_2 P_{54} + \lambda_3 P_{55} + \lambda_4 P_{56}$$

$$H = \lambda_1 P_{63} + \lambda_2 P_{64} + \lambda_3 P_{65} + \lambda_4 P_{66}$$

Figure 3:
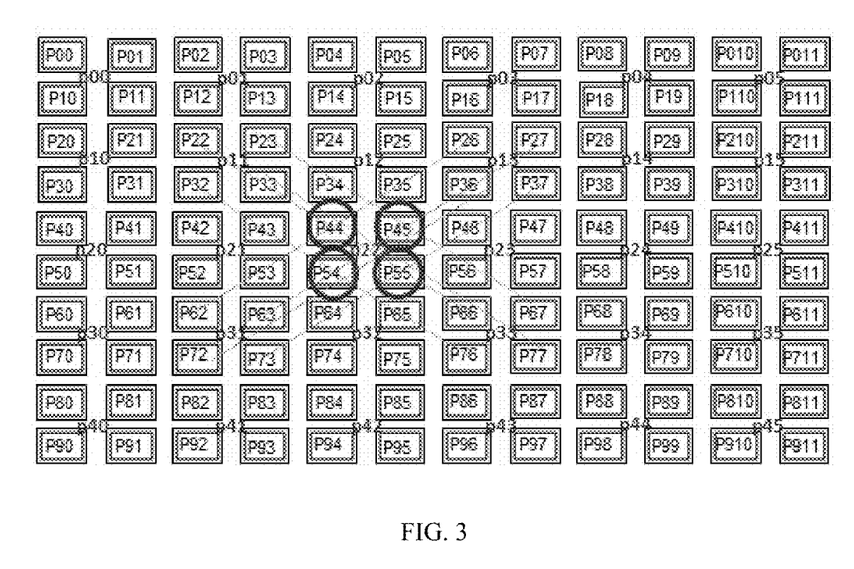
FIG. 3 is a schematic view of a pixel array for calculating pixel theoretical values of an original image according to an exemplary embodiment of the present invention.

Please also refer to FIG. 3, which is a schematic view of a pixel array for calculating theoretical values of pixel according to an exemplary embodiment of the present invention. As illustrated in FIG. 3, the four pixel neighboring with p22 on the four directions of 0-degree, 45-degree, 90-degree and 135-degree of p22 selected from the M*N pixels of the original image are P44, P45, P54, P55, and then the original values of the four pixels are substituted into the cubic interpolation formula (17) to calculate theoretical values of each pixel on the four directions as follows:

$P'_{44}(0)=\lambda_1 P_{42}+\lambda_2 P_{43}+\lambda_3 P_{45}+\lambda_4 P_{46}$ $P'_{44}(45)=\lambda_1 P_{62}+\lambda_2 P_{53}+\lambda_3 P_{35}+\lambda_4 P_{26}$ $P'_{44}(90)=\lambda_1 P_{24}+\lambda_2 P_{34}+\lambda_3 P_{54}+\lambda_4 P_{64}$ $P'_{44}(135)=\lambda_1 P_{22}+\lambda_2 P_{33}+\lambda_3 P_{55}+\lambda_4 P_{66}$ $P'_{45}(0)=\lambda_1 P_{43}+\lambda_2 P_{44}+\lambda_3 P_{46}+\lambda_4 P_{47}$ $P'_{45}(45)=\lambda_1 P_{63}+\lambda_2 P_{54}+\lambda_3 P_{36}+\lambda_4 P_{27}$ $P'_{45}(90)=\lambda_1 P_{25}+\lambda_2 P_{35}+\lambda_3 P_{55}+\lambda_4 P_{65}$ $P'_{45}(135)=\lambda_1 P_{23}+\lambda_2 P_{34}+\lambda_3 P_{56}+\lambda_4 P_{67}$ $P'_{54}(0)=\lambda_1 P_{52}+\lambda_2 P_{53}+\lambda_3 P_{55}+\lambda_4 P_{56}$ $P'_{54}(45)=\lambda_1 P_{72}+\lambda_2 P_{63}+\lambda_3 P_{45}+\lambda_4 P_{36}$ $P'_{54}(90)=\lambda_1 P_{34}+\lambda_2 P_{44}+\lambda_3 P_{64}+\lambda_4 P_{74}$ $P'_{54}(135)=\lambda_1 P_{32}+\lambda_2 P_{43}+\lambda_3 P_{65}+\lambda_4 P_{76}$ $P'_{55}(0)=\lambda_1 P_{53}+\lambda_2 P_{54}+\lambda_3 P_{56}+\lambda_4 P_{57}$ $P'_{55}(45)=\lambda_1 P_{63}+\lambda_2 P_{64}+\lambda_3 P_{46}+\lambda_4 P_{37}$ $P'_{55}(90)=\lambda_1 P_{35}+\lambda_2 P_{45}+\lambda_3 P_{65}+\lambda_4 P_{75}$ $P'_{55}(135)=\lambda_1 P_{33}+\lambda_2 P_{44}+\lambda_3 P_{66}+\lambda_4 P_{77}$ As described in the step S13, errors between the theoretical values and the original value of each one of P44, P45, P54, P55 are calculated, and the sum of errors on each of 0-degree, 45-degree, 90-degree and 135-degree further is determined as follows:

$\text{Sum\_error}_0=|P_{44}-P'_{44}(0)|+|P_{45}-P'_{45}(0)|+|P_{54}-P'_{54}(0)|+|P_{55}-P'_{55}(0)|$ $\text{Sum\_error}_{45}=|P_{44}-P'_{44}(45)|+|P_{45}-P'_{45}(45)|+|P_{54}-P'_{54}(45)|+|P_{55}-P'_{55}(45)|$ $\text{Sum\_error}_{90}=|P_{44}-P'_{44}(90)|+|P_{45}-P'_{45}(90)|+|P_{54}-P'_{54}(90)|+|P_{55}-P'_{55}(90)|$ $\text{Sum\_error}_{135}=|P_{44}-P'_{44}(135)|+|P_{45}-P'_{45}(135)|+|P_{54}-P'_{54}(135)|+|P_{55}-P'_{55}(135)|;$ According to the sums of error, the weight coefficients $k_0$, $k_{45}$, $k_{90}$, $k_{135}$ are calculated as follows:

$$k_0 = \frac{\text{Sum\_error}_{45}+\text{Sum\_error}_{90}+\text{Sum\_error}_{135}}{3(\text{Sum\_error}_0+\text{Sum\_error}_{45}+\text{Sum\_error}_{90}+\text{Sum\_error}_{135})}$$

$$k_{45} = \frac{\text{Sum\_error}_0+\text{Sum\_error}_{90}+\text{Sum\_error}_{135}}{3(\text{Sum\_error}_0+\text{Sum\_error}_{45}+\text{Sum\_error}_{90}+\text{Sum\_error}_{135})}$$

$$k_{90} = \frac{\text{Sum\_error}_0+\text{Sum\_error}_{45}+\text{Sum\_error}_{135}}{3(\text{Sum\_error}_0+\text{Sum\_error}_{45}+\text{Sum\_error}_{90}+\text{Sum\_error}_{135})}$$

$$k_{135} = \frac{\text{Sum\_error}_0+\text{Sum\_error}_{45}+\text{Sum\_error}_{90}}{3(\text{Sum\_error}_0+\text{Sum\_error}_{45}+\text{Sum\_error}_{90}+\text{Sum\_error}_{135})}$$

As described in the step S14, the weighted cubic interpolation calculation model corresponding to p22 is selected, and the calculated weight coefficients then are substituted into the weighted cubic interpolation calculation model to calculate an estimation value of p22 as follows:

$$p22 = \frac{\text{Sum}_{error_{45}}+\text{Sum}_{error_{90}}+\text{Sum}_{error_{135}}}{3(\text{Sum}_{error_0}+\text{Sum}_{error_{45}}+\text{Sum}_{error_{90}}\text{Sum}_{error_{135}})}$$

Figure 4:
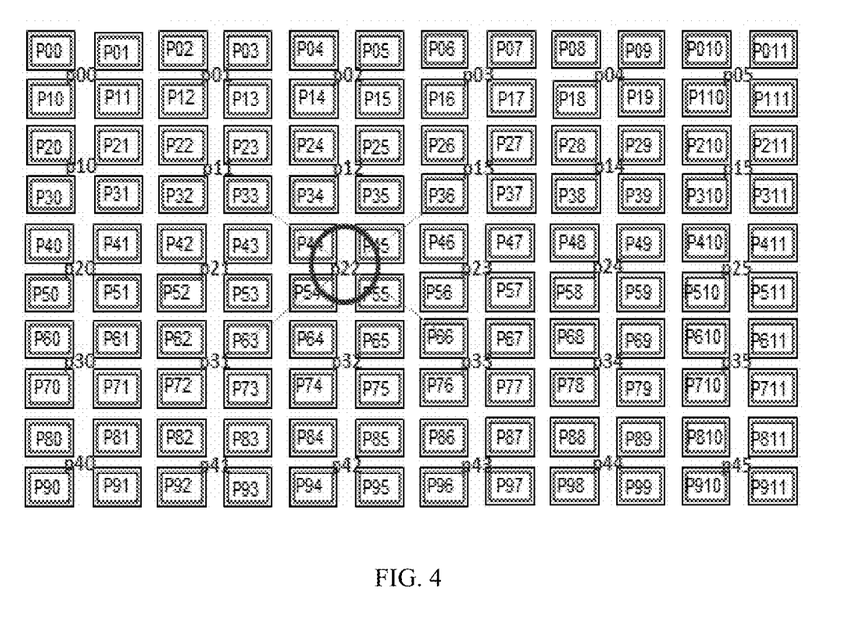
FIG. 4 is a schematic view of a pixel array for building a weighted cubic interpolation model according to a second embodiment of the present invention.

$(\lambda_1 A+\lambda_2 B+\lambda_3 C+\lambda_4 D)+$ $\frac{\text{Sum\_error}_0+\text{Sum\_error}_{90}+\text{Sum\_error}_{135}}{3(\text{Sum\_error}_0+\text{Sum\_error}_{45}+\text{Sum\_error}_{90}+\text{Sum\_error}_{135})}$ $(\lambda_1 P_{63}+\lambda_2 P_{54}+\lambda_3 P_{45}+\lambda_4 P_{36})+$ $\frac{\text{Sum\_error}_0+\text{Sum\_error}_{45}+\text{Sum\_error}_{135}}{3(\text{Sum\_error}_0+\text{Sum\_error}_{45}+\text{Sum\_error}_{90}+\text{Sum\_error}_{135})}$ $(\lambda_1 E+\lambda_2 F+\lambda_3 G+\lambda_4 H)+$ $\frac{\text{Sum\_error}_0+\text{Sum\_error}_{45}+\text{Sum\_error}_{90}}{3(\text{Sum\_error}_0+\text{Sum\_error}_{45}+\text{Sum\_error}_{90}+\text{Sum\_error}_{135})}$ $(\lambda_1 P_{33}+\lambda_2 P_{44}+\lambda_3 P_{55}+\lambda_4 P_{66})$ Please also refer to FIG. 4, which is a schematic view of a pixel array for building a weighted cubic interpolation calculation model according to a second embodiment of the present invention.

As described in the step S11, a weighted cubic interpolation calculation model for calculating p22 is:

$p_{22}=k_{45}(\lambda_1 P_{63}+\lambda_2 P_{54}+\lambda_3 P_{45}+\lambda_4 P_{36})+k_{135}(\lambda_1 P_{33}+\lambda_2 P_{44}+\lambda_3 P_{55}+\lambda_4 P_{66})$ where $P_{63}$, $P_{54}$, $P_{45}$, $P_{36}$ are four pixels neighboring with p22 on the 45-degree direction of p22 in the pixels P00~P911 of the original image, $P_{33}$, $P_{44}$, $P_{55}$, $P_{66}$ are four pixels neighboring with p22 on the 135-degree direction of p22 in the pixels P00~P911 of the original image.

Likewise, the four pixels neighboring with p22 selected from the pixel array of M*N pixels in the original image are P44, P45, P54, P55; by using the cubic interpolation formula (17), theoretical values on two directions of each pixel are calculated as follows:

$P'_{44}(45)=\lambda_1 P_{62}+\lambda_2 P_{53}+\lambda_3 P_{35}+\lambda_4 P_{26}$ $P'_{44}(135)=\lambda_1 P_{22}+\lambda_2 P_{33}+\lambda_3 P_{55}+\lambda_4 P_{66}$ $P'_{45}(45)=\lambda_1 P_{63}+\lambda_2 P_{54}+\lambda_3 P_{36}+\lambda_4 P_{27}$ $P'_{45}(135)=\lambda_1 P_{23}+\lambda_2 P_{34}+\lambda_3 P_{56}+\lambda_4 P_{67}$ $P'_{54}(45)=\lambda_1 P_{72}+\lambda_2 P_{63}+\lambda_3 P_{45}+\lambda_4 P_{36}$ $P'_{54}(135)=\lambda_1 P_{32}+\lambda_2 P_{43}+\lambda_3 P_{65}+\lambda_4 P_{76}$ $P'_{55}(45)=\lambda_1 P_{63}+\lambda_2 P_{64}+\lambda_3 P_{46}+\lambda_4 P_{37}$ $P'_{55}(135)=\lambda_1 P_{33}+\lambda_2 P_{44}+\lambda_3 P_{66}+\lambda_4 P_{77}$ As described in the step S13, errors between the theoretical values and the original value of each of P44, P45, P54, P55 are calculated, and a sum of the errors on each of the 45-degree and 135-degree directions further is determined as follows:

$\text{Sum\_error}_{45}=|P_{44}-P'_{44}(45)|+|P_{45}-P'_{45}(45)|+|P_{54}-P'_{54}(45)|+|P_{55}-P'_{55}(45)|$ $\text{Sum\_error}_{135}=|P_{44}-P'_{44}(135)|+|P_{45}-P'_{45}(135)|+|P_{54}-P'_{54}(135)|+|P_{55}-P'_{55}(135)|;$ According to the sums of error, the weight coefficients $k_{45}$, $k_{135}$ are calculated as follows:

$$k_{45} = \frac{\text{Sum\_error}_{135}}{\text{Sum\_error}_{45} + \text{Sum\_error}_{135}}$$

$$k_{135} = \frac{\text{Sum\_error}_{45}}{\text{Sum\_error}_{45} + \text{Sum\_error}_{135}}$$

As described in the step S14, the weighted cubic interpolation calculation model corresponding to p22 is selected, and the calculated weight coefficients then are substituted into the selected weighted cubic interpolation calculation model to calculate an estimation value of p22 as follows:

$$p_{22} = \frac{\text{Sum\_error}_{135}}{\text{Sum\_error}_{45} + \text{Sum\_error}_{135}} *(\lambda_1 P_{63} + \lambda_2 P_{54} + \lambda_3 P_{45} + \lambda_4 P_{36}) + \frac{\text{Sum\_error}_{45}}{\text{Sum\_error}_{45} + \text{Sum\_error}_{135}} *(\lambda_1 P_{33} + \lambda_2 P_{44} + \lambda_3 P_{55} + \lambda_4 P_{66}).$$

As described above, by calculating P*Q number of DS pixels, a downsampling processed image can be obtained consequently. The obtained downsampling processed image then be displayed.

Figure 5:
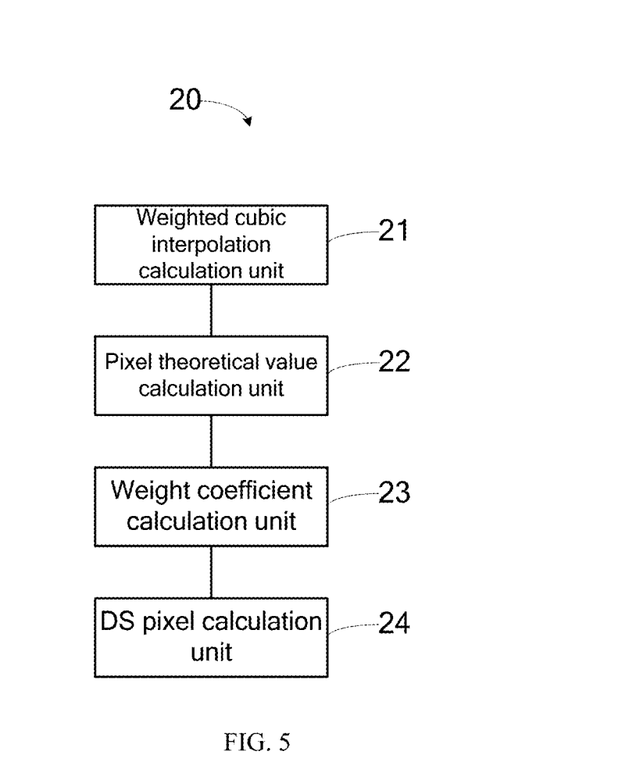
FIG. 5 is a schematic functional block diagram of a downsampling based display apparatus according to an exemplary embodiment of the present invention.

Please refer to FIG. 5, which is a schematic functional block diagram of a downsampling based display apparatus according to an exemplary embodiment of the present invention. As illustrated in FIG. 5, the apparatus 20 includes a weighted cubic interpolation calculation unit 21, a pixel theoretical value calculation unit 22, a weight coefficient calculation unit 23, and a DS pixel calculation unit 24. In an exemplary embodiment, the weighted cubic interpolation calculation unit 21, the pixel theoretical value calculation unit 22, the weight coefficient calculation unit 23 and the DS pixel calculation unit 24 are software modules stored in a memory and executable by one or more processors.

The weighted cubic interpolation calculation unit 21 is configured (structured and arranged) to select at least four pixels neighboring with the DS pixel on each of at least two directions from the M*N pixels in the original image to obtain at least eight neighboring pixels, and build a weighted cubic interpolation calculation model for calculating the DS pixel in advance according to obtained at least eight neighboring pixels.

In this embodiment, the at least two directions are four directions of 0-degree, 45-degree, 90-degree and 135-degree with respect to the DS pixel. That is, the weighted cubic interpolation calculation unit 21 selects four pixels neighboring with the DS pixel on each of the four directions of 0-degree, 45-degree, 90-degree and 135-degree of the DS pixel from the M*N pixels in the original image to obtain sixteen neighboring pixels, and then builds the weighted cubic interpolation calculation model as follows:

$$p_m = k_0(\lambda_1 A + \lambda_2 B + \lambda_3 C + \lambda_4 D) + k_{45}(\lambda_1 P_{h1} + \lambda_2 P_{h2} + \lambda_3 P_{h3} + \lambda_4 P_{h4}) + k_{90}(\lambda_1 E + \lambda_2 F + \lambda_3 G + \lambda_4 H) + k_{135}(\lambda_1 P_{h5} + \lambda_2 P_{h6} + \lambda_3 P_{h7} + \lambda_4 P_{h8});$$

where $p_m$ is a to-be-calculated DS pixel, $\lambda_1, \lambda_2, \lambda_3, \lambda_4$ are cubic interpolation coefficients; $P_{h1}$~$P_{h4}$ are four pixels neighboring with $p_m$ on the 45-degree direction of $p_m$ in the M*N pixels of the original image; $P_{h5}$~$P_{h8}$ are four pixels neighboring with $p_m$ on the 135-degree direction of $p_m$ in the M*N pixels of the original image; A, B, C, D are four pixels neighboring with $p_m$ on the 0-degree direction of $p_m$ in the M*N pixels of the original image; E, F, G, H are four pixels neighboring with $p_m$ on the 90-degree direction of $p_m$ in the M*N pixels of the original image; $k_0, k_{45}, k_{90}, k_{135}$ are weight coefficients, and $k_0 + k_{45} + k_{90} + k_{135} = 1$. The weighted cubic interpolation calculation unit 21 further can determine corresponding values of A, B, C, D, E, F, G, H according to the cubic interpolation coefficients $\lambda_1, \lambda_2, \lambda_3, \lambda_4$ and the four pixels neighboring with $p_m$ on each of 0-degree, 45-degree, 90-degree and 135-degree directions of $p_m$ in the M*N pixels of the original image.

Specifically, the weighted cubic interpolation calculation unit 21 determines the values of A, B, C, D, E, F, G, H according to the following formulas:

$$W_1 = \lambda_1 P_{n1} + \lambda_2 P_{n2} + \lambda_3 P_{n3} + \lambda_4 P_{n4} \quad (18)$$

$$W_2 = \lambda_1 P_{m1} + \lambda_2 P_{m2} + \lambda_3 P_{m3} + \lambda_4 P_{m4} \quad (19)$$

where, the obtained four pixels on each of the four directions of 0-degree, 45-degree, 90-degree and 135-degree of the DS pixel cooperatively constitute a pixel array of 4*4, the formula (18) is used to calculate the values of A, B, C, D; $P_{n1}, P_{n2}, P_{n3}, P_{n4}$ are four pixels in each column of the pixel array of 4*4; the formula (19) is used to calculate the values of E, F, G, H; $P_{m1}, P_{m2}, P_{m3}, P_{m4}$ are four pixels in each row of the pixel array of 4*4.

In another embodiment, the at least two directions are two directions of 45-degree and 135-degree with respect to the DS pixel. That is, the weighted cubic interpolation calculation unit 21 selects four pixels neighboring with the DS pixel on each of the two directions of 45-degree and 135-degree of the DS pixel from the M*N pixels in the original image to obtain eight neighboring pixels, and then builds the weighted cubic interpolation calculation model:

$$p_m = k_{45}(\lambda_1 P_{h1} + \lambda_2 P_{h2} + \lambda_3 P_{h3} + \lambda_4 P_{h4}) + k_{135}(\lambda_1 P_{h5} + \lambda_2 P_{h6} + \lambda_3 P_{h7} + \lambda_4 P_{h8});$$

where $p_m$ is the DS pixel, $\lambda_1, \lambda_2, \lambda_3, \lambda_4$ are cubic interpolation coefficients, $P_{h1}$~$P_{h4}$ are four pixels neighboring with $p_m$ on the 45-degree direction of $p_m$ in the M*N pixels of the original image, $P_{h5}$~$P_{h8}$ are four pixels neighboring with $p_m$ on the 135-degree direction of $p_m$ in the M*N pixels of the original image, $k_{45}, k_{135}$ are weight coefficients, and $k_{45} + k_{135} = 1$ The pixel theoretical value calculation unit 22 is configured to select at least two pixels neighboring with the DS pixel on each of at least two directions of the DS pixel from the pixel array M*N of the original image to obtain at least four neighboring pixels, and calculate theoretical values of each of the at least four neighboring pixels by using the cubic interpolation formula (17).

The weight coefficient calculation unit 23 is configured to calculate errors between the theoretical values determined by the pixel theoretical value calculation unit 22 and corresponding original values, and further determine weight coefficients for calculating the corresponding DS pixel according the errors.

The DS pixel calculation unit 24 is configured to select a corresponding weighted cubic interpolation calculation model, and calculate the DS pixel according to the determined weight coefficients.

Furthermore, as to the other DS pixels in the target image, the display apparatus 20 uses the above processing method to obtain corresponding estimation values, and thereby a downsampling processed image (target image) is obtained.

The DS pixel being p22 is taken as an example to describe the first embodiment of the present invention below in detail.

The weighted cubic interpolation calculation unit 21 builds a weighted cubic interpolation calculation model for calculating p22 as:

$$p_{22} = k_0(\lambda_1 A + \lambda_2 B + \lambda_3 C + \lambda_4 D) + k_{45}(\lambda_1 P_{63} + \lambda_2 P_{54} + \lambda_3 P_{45} + \lambda_4 P_{36}) + k_{90}(\lambda_1 E + \lambda_2 F + \lambda_3 G + \lambda_4 H) + k_{135}(\lambda_1 P_{33} + \lambda_2 P_{44} + \lambda_3 P_{55} + \lambda_4 P_{66})$$

where $P_{63}$, $P_{54}$, $P_{45}$, $P_{36}$ are four pixels neighboring with p22 on the 45-degree direction of p22 in the pixels P00~P911 of the original image; and $P_{33}$, $P_{44}$, $P_{55}$, $P_{66}$ are four pixels neighboring with p22 on the 135-degree direction of p22 in the pixels P00~P911 of the original image.

The weighted cubic interpolation calculation unit 21 further, according to the cubic interpolation coefficients $\lambda_1$, $\lambda_2$, $\lambda_3$, $\lambda_4$ and the four pixels neighboring with p22 on each of the four directions of 0-degree, 45-degree, 90-degree and 135-degree of p22 in the pixels P00~P911 of the original image, determines the values of A, B, C, D, E, F, G, H as:

$$A=\lambda_1 P_{33}+\lambda_2 P_{43}+\lambda_3 P_{53}+\lambda_4 P_{63}$$

$$B=\lambda_1 P_{34}+\lambda_2 P_{44}+\lambda_3 P_{54}+\lambda_4 P_{64}$$

$$C=\lambda_1 P_{35}+\lambda_2 P_{45}+\lambda_3 P_{55}+\lambda_4 P_{65}$$

$$D=\lambda_1 P_{36}+\lambda_2 P_{46}+\lambda_3 P_{56}+\lambda_4 P_{66}$$

$$E=\lambda_1 P_{33}+\lambda_2 P_{34}+\lambda_3 P_{35}+\lambda_4 P_{36}$$

$$F=\lambda_1 P_{43}+\lambda_2 P_{44}+\lambda_3 P_{45}+\lambda_4 P_{46}$$

$$G=\lambda_1 P_{53}+\lambda_2 P_{54}+\lambda_3 P_{55}+\lambda_4 P_{56}$$

$$H=\lambda_1 P_{63}+\lambda_2 P_{64}+\lambda_3 P_{65}+\lambda_4 P_{66}$$

The pixel theoretical value calculation unit 22 selects the four pixels P44, P45, P54, P55 neighboring with p22 on the four directions from the M*N pixels of the original image, and calculates theoretical values of each pixel on the four directions by using the cubic interpolation formula (17) as:

$$P'_{44}(0)=\lambda_1 P_{42}+\lambda_2 P_{43}+\lambda_3 P_{45}+\lambda_4 P_{46}$$

$$P'_{44}(45)=\lambda_1 P_{62}+\lambda_2 P_{53}+\lambda_3 P_{35}+\lambda_4 P_{26}$$

$$P'_{44}(90)=\lambda_1 P_{24}+\lambda_2 P_{34}+\lambda_3 P_{54}+\lambda_4 P_{64}$$

$$P'_{44}(135)=\lambda_1 P_{22}+\lambda_2 P_{33}+\lambda_3 P_{55}+\lambda_4 P_{66}$$

$$P'_{45}(0)=\lambda_1 P_{43}+\lambda_2 P_{44}+\lambda_3 P_{46}+\lambda_4 P_{47}$$

$$P'_{45}(45)=\lambda_1 P_{63}+\lambda_2 P_{54}+\lambda_3 P_{36}+\lambda_4 P_{27}$$

$$P'_{45}(90)=\lambda_1 P_{25}+\lambda_2 P_{35}+\lambda_3 P_{55}+\lambda_4 P_{65}$$

$$P'_{45}(135)=\lambda_1 P_{23}+\lambda_2 P_{34}+\lambda_3 P_{56}+\lambda_4 P_{67}$$

$$P'_{54}(0)=\lambda_1 P_{52}+\lambda_2 P_{53}+\lambda_3 P_{55}+\lambda_4 P_{56}$$

$$P'_{54}(45)=\lambda_1 P_{72}+\lambda_2 P_{63}+\lambda_3 P_{45}+\lambda_4 P_{36}$$

$$P'_{54}(90)=\lambda_1 P_{34}+\lambda_2 P_{44}+\lambda_3 P_{64}+\lambda_4 P_{74}$$

$$P'_{54}(135)=\lambda_1 P_{32}+\lambda_2 P_{43}+\lambda_3 P_{65}+\lambda_4 P_{76}$$

$$P'_{55}(0)=\lambda_1 P_{53}+\lambda_2 P_{54}+\lambda_3 P_{56}+\lambda_4 P_{57}$$

$$P'_{55}(45)=\lambda_1 P_{63}+\lambda_2 P_{64}+\lambda_3 P_{46}+\lambda_4 P_{37}$$

$$P'_{55}(90)=\lambda_1 P_{35}+\lambda_2 P_{45}+\lambda_3 P_{65}+\lambda_4 P_{75}$$

$$P'_{55}(135)=\lambda_1 P_{33}+\lambda_2 P_{44}+\lambda_3 P_{66}+\lambda_4 P_{77}$$

The weight coefficient calculation unit 23 calculates errors between the theoretical values of P44, P45, P54, P55 and original values thereof, and further determines a sum of error on each of the 0-degree, 45-degree, 90-degree and 135-degree as:

$$\text{Sum\_error}_0=|P_{44}-P'_{44}(0)|+|P_{45}-P'_{45}(0)|+|P_{54}-P'_{54}(0)|+|P_{55}-P'_{55}(0)|$$

$$\text{Sum\_error}_{45}=|P_{44}-P'_{44}(45)|+|P_{45}-P'_{45}(45)|+|P_{54}-P'_{54}(45)|+|P_{55}-P'_{55}(45)|$$

$$\text{Sum\_error}_{90}=|P_{44}-P'_{44}(90)|+|P'_{45}-P_{45}(90)|+|P_{54}-P_{54}(90)|+|P_{55}-P_{55}(90)|$$

$$\text{Sum\_error}_{135}=|P_{44}-P'_{44}(135)|+|P_{45}-P'_{45}(135)|+|P_{54}-P'_{54}(135)|+|P_{55}-P'_{55}(135)|;$$

The weight coefficient calculation unit 23 further calculates the weight coefficients $k_0$, $k_{45}$, $k_{90}$, $k_{135}$ according to the sums of error as that:

$$k_0 = \frac{\text{Sum\_error}_{45} + \text{Sum\_error}_{90} + \text{Sum\_error}_{135}}{3(\text{Sum\_error}_0 + \text{Sum\_error}_{45} + \text{Sum\_error}_{90} + \text{Sum\_error}_{135})}$$

$$k_{45} = \frac{\text{Sum\_error}_0 + \text{Sum\_error}_{90} + \text{Sum\_error}_{135}}{3(\text{Sum\_error}_0 + \text{Sum\_error}_{45} + \text{Sum\_error}_{90} + \text{Sum\_error}_{135})}$$

$$k_{90} = \frac{\text{Sum\_error}_0 + \text{Sum\_error}_{45} + \text{Sum\_error}_{135}}{3(\text{Sum\_error}_0 + \text{Sum\_error}_{45} + \text{Sum\_error}_{90} + \text{Sum\_error}_{135})}$$

$$k_{135} = \frac{\text{Sum\_error}_0 + \text{Sum\_error}_{45} + \text{Sum\_error}_{90}}{3(\text{Sum\_error}_0 + \text{Sum\_error}_{45} + \text{Sum\_error}_{90} + \text{Sum\_error}_{135})}$$

The DS pixel calculation unit 24 selects a weighted cubic interpolation calculation model corresponding to p22, and substitutes the calculated weight coefficients into the selected weighted cubic interpolation calculation model to calculate an estimation value of p22 as:

$$p22 = \frac{\text{Sum}_{error_{45}} + \text{Sum}_{error_{90}} + \text{Sum}_{error_{135}}}{3(\text{Sum}_{error_0} + \text{Sum}_{error_{45}} + \text{Sum}_{error_{90}}\text{Sum}_{error_{135}})}$$

$$(\lambda_1 A + \lambda_2 \cdot B + \lambda_3 C + \lambda_4 D) +$$

$$\frac{\text{Sum\_error}_0 + \text{Sum\_error}_{90} + \text{Sum\_error}_{135}}{3(\text{Sum\_error}_0 + \text{Sum\_error}_{45} + \text{Sum\_error}_{90} + \text{Sum\_error}_{135})}$$

$$(\lambda_1 P_{63} + \lambda_2 P_{54} + \lambda_3 P_{45} + \lambda_4 P_{36}) +$$

$$\frac{\text{Sum\_error}_0 + \text{Sum\_error}_{45} + \text{Sum\_error}_{135}}{3(\text{Sum\_error}_0 + \text{Sum\_error}_{45} + \text{Sum\_error}_{90} + \text{Sum\_error}_{135})}$$

$$(\lambda_1 E + \lambda_2 F + \lambda_3 G + \lambda_4 H) +$$

$$\frac{\text{Sum\_error}_0 + \text{Sum\_error}_{45} + \text{Sum\_error}_{90}}{3(\text{Sum\_error}_0 + \text{Sum\_error}_{45} + \text{Sum\_error}_{90} + \text{Sum\_error}_{135})}$$

$$(\lambda_1 P_{33} + \lambda_2 P_{44} + \lambda_3 P_{55} + \lambda_4 P_{66}).$$

The DS pixel being p22 is taken as an example to describe a second embodiment of the present invention below in detail.

The weighted cubic interpolation calculation unit 21 builds a weighted cubic interpolation calculation model for calculating p22 as:

$$p_{22}=k_{45}(\lambda_1 P_{63}+\lambda_2 P_{54}+\lambda_3 P_{45}+\lambda_4 P_{36})+k_{135}(\lambda_1 P_{33}+\lambda_2 P_{44}+\lambda_3 P_{55}+\lambda_4 P_{66});$$

where $P_{63}$, $P_{54}$, $P_{45}$, $P_{36}$ are four pixels neighboring with p22 on the 45-degree direction of p22 in the pixels P00~P911 of the original image; and $P_{33}$, $P_{44}$, $P_{55}$, $P_{66}$ are four pixels neighboring with p22 on the 135-degree direction of p22 in the pixels P00~P911 of the original image.

Likewise, the pixel theoretical value calculation unit 22 selects four pixels P44, P45, P54, P55 neighboring with p22 on two directions from the M*N pixels of the original image, and calculates theoretical values of each pixel on the two directions by using the cubic interpolation formula (17) as that:

$$P'_{44}(45)=\lambda_1 P_{62}+\lambda_2 P_{53}+\lambda_3 P_{35}+\lambda_4 P_{26}$$

$P'_{44}(135)=\lambda_1 P_{22}+\lambda_2 P_{33}+\lambda_3 P_{55}+\lambda_4 P_{66}$ $P'_{45}(45)=\lambda_1 P_{63}+\lambda_2 P_{54}+\lambda_3 P_{36}+\lambda_4 P_{27}$ $P'_{45}(135)=\lambda_1 P_{23}+\lambda_2 P_{34}+\lambda_3 P_{56}+\lambda_4 P_{67}$ $P'_{54}(45)=\lambda_1 P_{72}+\lambda_2 P_{63}+\lambda_3 P_{45}+\lambda_4 P_{36}$ $P'_{54}(135)=\lambda_1 P_{32}+\lambda_2 P_{43}+\lambda_3 P_{65}+\lambda_4 P_{76}$ $P'_{55}(45)=\lambda_1 P_{63}+\lambda_2 P_{64}+\lambda_3 P_{46}+\lambda_4 P_{37}$ $P'_{55}(135)=\lambda_1 P_{33}+\lambda_2 P_{44}+\lambda_3 P_{66}+\lambda_4 P_{77}$ The weight coefficient calculation unit 23 calculates errors between the theoretical values of P44, P45, P54, P55 and corresponding original values thereof, and further determines a sum of errors on each of the 45-degree and 135-degree directions as:

$$\text{Sum\_error}_{45}=|P_{44}-P'_{44}(45)|+|P_{45}-P'_{45}(45)|+|P_{54}-P'_{54}(45)|+|P_{55}-P'_{55}(45)|$$

$$\text{Sum\_error}_{135}=|P_{44}-P'_{44}(135)|+|P_{45}-P'_{45}(135)|+|P_{54}-P'_{54}(135)|+|P_{55}-P'_{55}(135)|;$$

The weight coefficient calculation unit 23 further calculates the weight coefficients $k_{45}$, $k_{135}$ according to the sums of error as that:

$$k_{45} = \frac{\text{Sum\_error}_{135}}{\text{Sum\_error}_{45} + \text{Sum\_error}_{135}}$$

$$k_{135} = \frac{\text{Sum\_error}_{45}}{\text{Sum\_error}_{45} + \text{Sum\_error}_{135}}$$

The DS pixel calculation unit 24 selects a weighted cubic interpolation calculation model corresponding to p22 and substitutes the calculated weight coefficients into the selected weighted cubic interpolation calculation model to calculate an estimation value of p22 as:

$$p_{22} = \frac{\text{Sum\_error}_{135}}{\text{Sum\_error}_{45} + \text{Sum\_error}_{135}} * (\lambda_1 P_{63} + \lambda_2 P_{54} + \lambda_3 P_{45} + \lambda_4 P_{36}) + \frac{\text{Sum\_error}_{45}}{\text{Sum\_error}_{45} + \text{Sum\_error}_{135}} * (\lambda_1 P_{33} + \lambda_2 P_{44} + \lambda_3 P_{55} + \lambda_4 P_{66}).$$

As described above, by calculating P*Q number of DS pixels, a downsampling processed image can be obtained consequently. The obtained downsampling processed image then can be displayed.

In summary, the present invention provides downsampling based display method and display apparatus, by building a weighted cubic interpolation model for a to-be-calculated DS pixel, using the model to calculate theoretical values of original image pixels neighboring with the to-be-calculated DS pixel, then analyzing errors between the theoretical values and corresponding original values to obtain weight coefficients fed back to the weighted cubic interpolation model for calculating the DS pixel. Such DS method of pixel-based calculation can avoid the color aliasing of the subpixel-based DS method, and also can obtain sharp image.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A downsampling based display method comprising:
   obtaining an input image, wherein the input image comprises a plurality of pixels;
   obtaining at least two pixels, which are neighboring with a to-be-calculated downsampling pixel in a target image, on each of at least two directions from the plurality of pixels of the input image to obtain at least four first neighboring pixels, and calculating theoretical values of the at least four first neighboring pixels on the at least two directions;
   obtaining errors between the theoretical values of the at least four first neighboring pixels and a corresponding original value, and determining weight coefficients for calculating the downsampling pixel according to the errors;
   calculating an estimation value of the downsampling pixel according to the weight coefficients and a weighted cubic interpolation calculation model built in advance for the downsampling pixel, using the above steps to calculate corresponding estimation values of the other downsampling pixels in the target image, and thereby obtaining a downsampling processed image; and
   displaying the downsampling processed image.

2. The method as claimed in claim 1, wherein after the step of obtaining an input image, further comprises:
   obtaining at least four pixels neighboring with the downsampling pixel on each of at least two directions from the plurality of pixels of the input image to obtain at least eight second neighboring pixels, and building the weighted cubic interpolation calculation model according to the at least eight second neighboring pixels.

3. The method as claimed in claim 2, wherein the at least two directions are four directions of 0-degree, 45-degree, 90-degree and 135-degree with respect to the downsampling pixel, the correspondingly sixteen second neighboring pixels are obtained; the weighted cubic interpolation calculation model is:

$$p_m = k_0(\lambda_1 A+\lambda_2 B+\lambda_3 C+\lambda_4 D)+k_{45}(\lambda_1 P_{h1}+\lambda_2 P_{h2}+\lambda_3 P_{h3}+\lambda_4 P_{h4})+k_{90}(\lambda_1 E+\lambda_2 F+\lambda_3 G+\lambda_4 H)+k_{135}(\lambda_1 P_{h5}+\lambda_2 P_{h6}+\lambda_3 P_{h7}+\lambda_4 P_{h8});$$

where $p_m$ is the downsampling pixel, $\lambda_1$, $\lambda_2$, $\lambda_3$, $\lambda_4$ are cubic interpolation coefficients, $P_{h1} \sim P_{h4}$ are four pixels neighboring with $p_m$ on a 45-degree direction of $p_m$ in the plurality of pixels of the input image, $P_{h5} \sim P_{h8}$ are four pixels neighboring with $p_m$ on a 135-degree direction of $p_m$ in the plurality of pixels of the input image; A, B, C, D are four pixels neighboring with $p_m$ on a 0-degree direction of $p_m$ in the plurality of pixels of the input image; E, F, G, H are four pixels neighboring with $p_m$ on a 90-degree direction of $p_m$ in the plurality of pixels of the input image; $k_0$, $k_{45}$, $k_{90}$, $k_{135}$ are weight coefficients, and $k_0+k_{45}+k_{90}+k_{135}=1$.

4. The method as claimed in claim 3, wherein values of A, B, C, D, E, F, G, H are determined according to the following formulas:

$$W_1=\lambda_1 P_{n1}+\lambda_2 P_{n2}+\lambda_3 P_{n3}+\lambda_4 P_{n4} \quad (1)$$

$$W_2=\lambda_1 P_{m1}+\lambda_2 P_{m2}+\lambda_3 P_{m3}+\lambda_4 P_{m4} \quad (2)$$

where, the obtained four pixels on each of the four directions of 0-degree, 45-degree, 90-degree and 135-degree with respect to the downsampling pixel constitute a pixel array of 4*4; the formula (1) is used to calculate the values of A, B, C, D; $P_{n1}$, $P_{n2}$, $P_{n3}$, $P_{n4}$ are four pixels in each column of the pixel array; the formula (2) is used to calculate the values of E, F, G, H; and $P_{m1}$, $P_{m2}$, $P_{m3}$, $P_{m4}$ are four pixels in each row of the pixel array.

5. The method as claimed in claim 3, wherein calculating theoretical values of each of the at least four first neighboring pixels on the at least two directions comprises:
substituting an original value of each pixel of the at least four first neighboring pixels into a cubic interpolation formula to calculate the theoretical values of the pixel on the at least two directions, wherein the cubic interpolation formula is:

$$P'_{j1}(x)=\lambda_1 P_{j2}+\lambda_2 P_{j3}+\lambda_3 P_{j4}+\lambda_4 P_{j5};$$

where, x is a value of a corresponding one of the at least two directions, $P_{j2}$, $P_{j3}$, $P_{j4}$, $P_{j5}$ are pixels neighboring with the downsampling pixel on the corresponding direction of the downsampling pixel in the plurality of pixels of the input image; $P'_{j1}$ is an interpolation value of $P_{j2}$, $P_{j3}$, $P_{j4}$, $P_{j5}$.

6. The method as claimed in claim 2, wherein the at least two directions are two directions of 45-degree and 135-degree with respect to the downsampling pixel, and correspondingly eight second neighboring pixels are obtained; the weighted cubic interpolation calculation model is:

$$p_m=k_{45}(\lambda_1 P_{h1}+\lambda_2 P_{h2}+\lambda_3 P_{h3}+\lambda_4 P_{h4})+k_{135}(\lambda_1 P_{h5}+\lambda_2 P_{h6}+\lambda_3 P_{h7}+\lambda_4 P_{h8});$$

where, pm is the downsampling pixel, $\lambda_1$, $\lambda_2$, $\lambda_3$, $\lambda_4$ are cubic interpolation coefficients, $P_{h1}$~$P_{h4}$ are four pixels neighboring with $p_m$ on a 45-degree direction of $p_m$ in the plurality of pixels of the input image, and $P_{h5}$~$P_{h8}$ are four pixels neighboring with $p_m$ on a 135-degree direction of $p_m$ in the plurality of pixels of the input image; $k_{45}$, $k_{135}$ are weight coefficients, and $k_{45}+k_{135}=1$.

7. The method as claimed in claim 6, wherein calculating theoretical values of each of the at least four first neighboring pixels on the at least two directions comprises:
substituting an original value of each pixel of the at least four first neighboring pixels into a cubic interpolation formula to calculate the theoretical values of the pixel on the at least two directions, wherein the cubic interpolation formula is:

$$P'_{j1}(x)=\lambda_1 P_{j2}+\lambda_2 P_{j3}+\lambda_3 P_{j4}+\lambda_4 P_{j5};$$

where, x is a value of a corresponding one of the at least two directions, $P_{j2}$, $P_{j3}$, $P_{j4}$, $P_{j5}$ are pixels neighboring with the downsampling pixel on the corresponding direction of the downsampling pixel in the plurality of pixels of the input image; $P'_{j1}$ is an interpolation value of $P_{j2}$, $P_{j3}$, $P_{j4}$, $P_{j5}$.

8. A downsampling based display apparatus adapted for being inputted with an image including a plurality of pixels; the display apparatus comprising:
a pixel theoretical value calculation unit, configured to obtain at least two pixels, which are neighboring with a to-be-calculated downsampling pixel in a target image, on each of at least two directions from the plurality of pixels of the input image to thereby obtain at least four first neighboring pixels, and calculate theoretical values of the at least four first neighboring pixels on the at least two directions;
a weighted cubic interpolation calculation unit, configured to obtain at least four pixels, which are neighboring with the downsampling pixel, on each of at least two directions from the plurality of pixels of the input image to thereby obtain at least eight second neighboring pixels, and build a weighted cubic interpolation calculation model for calculating the downsampling pixel in advance according to the at least eight second neighboring pixels;
a weight coefficient calculation unit, configured to obtain errors of the theoretical values of the at least four first neighboring pixels and a corresponding original value, and determines weight coefficients for calculating the downsampling pixel according to the errors; and
a downsampling pixel calculation unit, configured to select a corresponding weighted cubic interpolation calculation model according to the weight coefficients to calculate an estimation value of the downsampling pixel;
wherein the display apparatus calculates a corresponding estimation value of each downsampling pixel in the target image, and thereby a downsampling processed image is obtained and is displayed on the downsampling based display apparatus.

9. The display apparatus as claimed in claim 8, wherein the at least two directions are four directions of 0-degree, 45-degree, 90-degree and 135-degree with respect to the downsampling pixel, the correspondingly sixteen second neighboring pixels are obtained; the weighted cubic interpolation calculation model built by the weighted cubic interpolation calculation unit in advance is:

$$p_m=k_0(\lambda_1 A+\lambda_2 B+\lambda_3 C+\lambda_4 D)+k_{45}(\lambda_1 P_{h1}+\lambda_2 P_{h2}+\lambda_3 P_{h3}+\lambda_4 P_{h4})+k_{90}(\lambda_1 E+\lambda_2 F+\lambda_3 G+\lambda_4 H)+k_{135}(\lambda_1 P_{h5}+\lambda_2 P_{h6}+\lambda_3 P_{h7}+\lambda_4 P_{h8});$$

where $p_m$ is the downsampling pixel, $\lambda_1$, $\lambda_2$, $\lambda_3$, $\lambda_4$ are cubic interpolation coefficients, $P_{h1}$~$P_{h4}$ are four pixels neighboring with $p_m$ on a 45-degree direction of $p_m$ in the plurality of pixels of the input image, $P_{h5}$~$P_{h8}$ are four pixels neighboring with $p_m$ on a 135-degree direction of $p_m$ in the plurality of pixels of the input image; A, B, C, D are four pixels neighboring with $p_m$ on a 0-degree direction of $p_m$ in the plurality of pixels of the input image; E, F, G, H are four pixels neighboring with $p_m$ on a 90-degree direction of $p_m$ in the plurality of pixels of the input image; $k_0$, $k_{45}$, $k_{90}$, $k_{135}$ are weight coefficients, and $k_0+k_{45}+k_{90}+k_{135}=1$.

10. The display apparatus as claimed in claim 9, wherein the pixel theoretical value calculation unit substitutes an original value of each pixel of the at least four first neighboring pixels into a cubic interpolation formula to calculate the theoretical values of the pixel on the at least two directions, and the cubic interpolation formula is:

$$P'_{j1}(x)=\lambda_1 P_{j2}+\lambda_2 P_{j3}+\lambda_3 P_{j4}+\lambda_4 P_{j5};$$

where, x is a value of a corresponding one of the at least two directions, $P_{j2}$, $P_{j3}$, $P_{j4}$, $P_{j5}$ are pixels neighboring with the downsampling pixel on the corresponding direction of the downsampling pixel in the plurality of pixels of the input image; $P'_{j1}$ is an interpolation value of $P_{j2}$, $P_{j3}$, $P_{j4}$, $P_{j5}$.

11. The display apparatus as claimed in claim 8, wherein the at least two directions are two directions of 45-degree and 135-degree with respect to the downsampling pixel, and correspondingly eight second neighboring pixels are obtained; the weighted cubic interpolation calculation model is:

$$p_m=k_{45}(\lambda_1 P_{h1}+\lambda_2 P_{h2}+\lambda_3 P_{h3}+\lambda_4 P_{h4})+k_{135}(\lambda_1 P_{h5}+\lambda_2 P_{h6}+\lambda_3 P_{h7}+\lambda_4 P_{h8});$$

where, pm is the downsampling pixel, $\lambda_1$, $\lambda_2$, $\lambda_3$, $\lambda_4$ are cubic interpolation coefficients, $P_{h1} \sim P_{h4}$ are four pixels neighboring with $p_m$ on a 45-degree direction of $p_m$ in the plurality of pixels of the input image, and $P_{h5} \sim P_{h8}$ are four pixels neighboring with $p_m$ on a 135-degree direction of $p_m$ in the plurality of pixels of the input image; $k_{45}$, $k_{135}$ are weight coefficients, and $k_{45} + k_{135} = 1$.

12. The display apparatus as claimed in claim 11, wherein the pixel theoretical value calculation unit substitutes an original value of each pixel of the at least four first neighboring pixels into a cubic interpolation formula to calculate the theoretical values of the pixel on the at least two directions, and the cubic interpolation formula is:

$$P'_{j1}(x) = \lambda_1 P_{j2} + \lambda_2 P_{j3} + \lambda_3 P_{j4} + \lambda_4 P_{j5};$$

where, x is a value of a corresponding one of the at least two directions, $P_{j2}$, $P_{j3}$, $P_{j4}$, $P_{j5}$ are pixels neighboring with the downsampling pixel on the corresponding direction of the downsampling pixel in the plurality of pixels of the input image; $P'_{j1}$ is an interpolation value of $P_{j2}$, $P_{j3}$, $P_{j4}$, $P_{j5}$.

13. A downsampling based display method comprising:

obtaining an input image, wherein the input image comprises a plurality of pixels;

obtaining at least four pixels, which are neighboring with a to-be-calculated downsampling pixel in a target image, on each of at least two directions from the plurality of pixels of the input image to obtain at least eight second neighboring pixels, and building a weighted cubic interpolation calculation model according to the at least eight second neighboring pixels;

obtaining at least two pixels, which are neighboring with the downsampling pixel, on each of at least two directions from the plurality of pixels of the input image to obtain at least four first neighboring pixels, and calculating theoretical values of the at least four first neighboring pixels on the at least two directions;

obtaining errors between the theoretical values of the at least four first neighboring pixels and a corresponding original value, and determining weight coefficients for calculating the downsampling pixel according to the errors;

calculating an estimation value of the downsampling pixel according to the weight coefficients and the weighted cubic interpolation calculation model, using the above steps to calculate corresponding estimation values of the other downsampling pixels in the target image, and thereby obtaining a downsampling processed image; and displaying the downsampling processed image.

* * * * *